Oct. 8, 1929.  C. F. NORTON  1,730,896
BEARING FOR SHAFTS
Filed May 15, 1926

INVENTOR.
Charles F. Norton
Elliott J. Stoddard
ATTORNEY.

Patented Oct. 8, 1929

1,730,896

UNITED STATES PATENT OFFICE

CHARLES F. NORTON, OF HOWELL, MICHIGAN, ASSIGNOR TO HOWELL ELECTRIC MOTORS COMPANY, OF HOWELL, MICHIGAN, A CORPORATION OF MICHIGAN

BEARING FOR SHAFTS

Application filed May 15, 1926. Serial No. 109,274.

My invention relates more particularly to electric motors and an object of my improvements is to provide a bearing that shall have little friction, that shall hold the rotor, or armature, accurately in position under working conditions, and that shall be permanent and not liable to get out of order.

The subject matter of the present application is in the nature of an improvement, or a perfecting, of the apparatus forming the subject matter of application No. 27,146, filed by me in the United States Patent Office May 1, 1925.

In electric motors of the better class the rotor, or armature, rotates with its periphery very close to the inner surface of the field magnet, or stator, and it is found that the armature shaft and the casing, or support for the field magnet, become heated to different degrees so that their relative dimensions are altered. For these reasons it is necessary to have carefully constructed bearings adapted to this particular apparatus. Roller bearings have been considered impracticable until the invention of my said previous application was made, but experience has shown that the spring for automatically adjusting the bearings may be broken in use and it is an object of my present invention to obviate this difficulty.

$a$, is the casing, or frame, of an electric motor. $a^2$, is the field magnet. $b$, is the armature, the periphery of which turns very close to the inner surface of the field magnet $a^2$, as indicated at $ab$.

$b^2$, is the shaft of the armature, or rotor, $b$. $a^3$ and $a^4$ are bearings in which the shaft $b^2$ rests on the case $a$.

$c$, is the inner race of a conical bearing and $d$ is the outer race thereof. $e$, indicates the conical rollers interposed between the races $c$ and $d$. The outer race $d$ is capable of a small axial movement. $f$, is a warped spring-ring interposed between the head $a^5$ of the bearing and the race $d$, so as to yieldingly press said race in an axial direction to hold it with a definite yielding force against the rollers $e$.

In this construction it has been found that the difference in expansion between the casing $a$ and shaft $b^2$ is provided for, but it has developed that a spring $f$ may break in use, thus allowing the bearing to get out of adjustment which may cause the destruction of the entire apparatus.

To prevent this I have provided an annular lug $g$ which projects inward from the cap $a^5$ of the bearing through the spring $f$ and to a position but a little removed from the ring $d$. Thus, the outward movement of said ring against the movement of the spring $f$ is limited and the spring is therefore not apt to be broken. If it should break, the race $d$ cannot move far enough to allow undue looseness in the bearing and therefore allow the armature to come into contact with the field.

Figure 1:
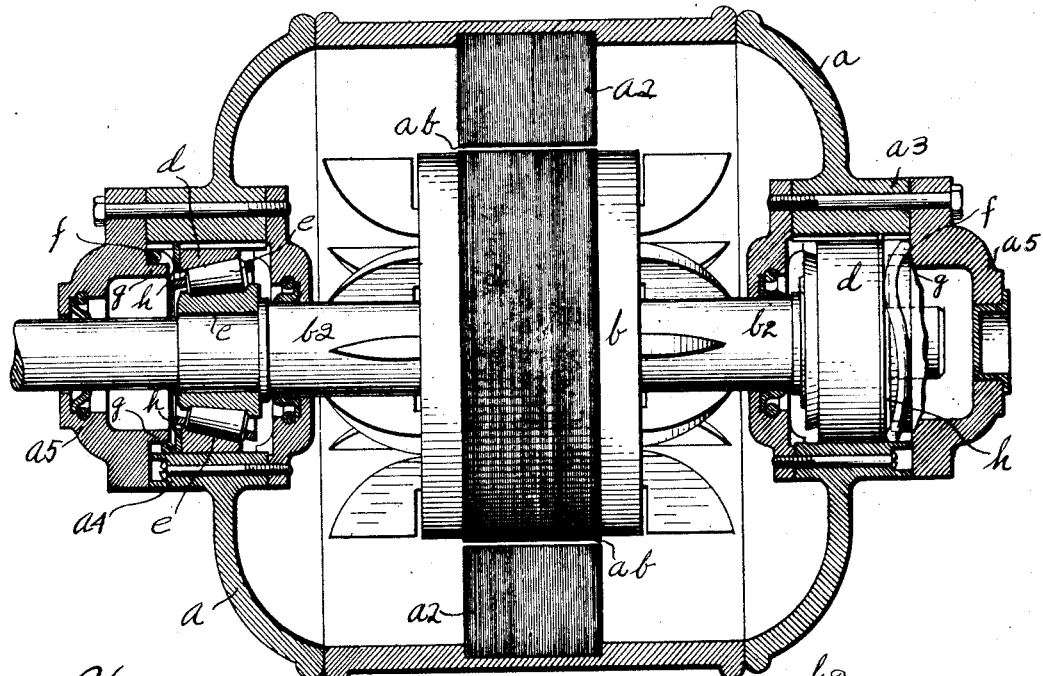
Figure 1, is a sectional elevation of an apparatus embodying my invention.
Figure 2:
Figure 2, is a view of the ring used in the bearing to prevent friction against the spring and also showing a part of the bearing in section.

I have also found that in use the spring $f$ will be worn as if by contact with the end surface of a rotating ring $d$. I have therefore provided a ring $h$ of sheet metal which is interposed between the end surface of the ring $d$ and the spring $f$. This ring is provided with a lug $h^2$ which engages in a groove in the bearing, as shown in Figure 2, to prevent rotation of the ring while permitting an axial movement thereof. In this way the wearing of the spring $f$ is obviated.

Figure 3:
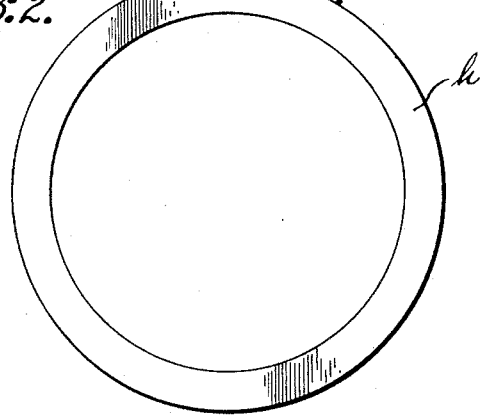
Figure 3, is a sectional view of a bearing showing a modified form.
Figure 4:
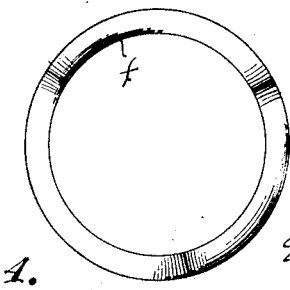
Figure 4, is a perspective view of the spring ring by means of which the bearing is automatically adjusted.

Instead of the annular projection $g$ extending within the spring-ring and serving for a guide therefore, an annular shoulder $g^2$ (Fig. 3) may be formed upon the bearing itself surrounding the spring-ring $f$ and serving for a guide therefor and to limit the inward movement of the race $d$ in the same way as the lug $g$.

Although I have described my invention as applied to an electric motor I do not wish to be limited to this application as there are obviously many other cases where it might be used.

The warped ring contacts the race, or interposed ring, at a plurality of points angularly spaced from each other at equal intervals so that there shall be no tendency to turn said race from its proper plane.

What I claim is:

1. In an apparatus of the kind described, a conical roller bearing having a race adapted to be forced into engagement with the interposed conical rollers, a warped spring ring acting upon said race at a plurality of points angularly spaced from each other to tend to force it into engagement with the rollers of said bearing and an annular lug extending through said ring and adapted to form a guide for the same and to limit the motion of said race towards said ring for the purpose described.

2. In an apparatus of the kind described, a conical roller bearing having an axially movable race, a warped spring ring acting against said race at a plurality of points angularly spaced from each other to force said race against the rollers of the bearing without turning said race from its proper plane, and a ring interposed between said spring and race and having a lug engaging a stationary part to prevent rotation of said interposed ring, while permitting said movement thereof, substantially as shown and described.

3. In an apparatus of the kind described, a conical bearing having a race adapted to be forced into engagement with the interposed conical rollers, a warped spring ring acting upon said race with a plurality of points angularly spaced from each other to tend to force said ring into engagement with the rollers of said bearing and a fixed annular lug extending through said ring and adapted to form a guide for the same and to limit the motion of said race toward said ring and an annular washer ring threaded upon said lug and interposed between the spring ring and said race, for the purpose described.

In testimony whereof, I sign this specification.

CHARLES F. NORTON.